US011145160B2

(12) United States Patent
Chen

(10) Patent No.: US 11,145,160 B2
(45) Date of Patent: Oct. 12, 2021

(54) SHARED VR GAME INTEGRATED MACHINE AND METHOD OF USING SAME

(71) Applicant: VR LEO USA, INC., Los Angeles, CA (US)

(72) Inventor: XiuChao Chen, Shanghai (CN)

(73) Assignee: VR LEO USA, INC., Los Angeles, CA (US)

( * ) Notice: Subject to any disclaimer, the term of this patent is extended or adjusted under 35 U.S.C. 154(b) by 253 days.

(21) Appl. No.: 16/249,831

(22) Filed: Jan. 16, 2019

(65) Prior Publication Data

US 2019/0221073 A1    Jul. 18, 2019

(30) Foreign Application Priority Data

Jan. 16, 2018 (CN) .......................... 201810041883.9
Jul. 6, 2018 (CN) .......................... 201810738220.2

(51) Int. Cl.
*A63F 13/98* (2014.01)
*G07F 17/32* (2006.01)
(Continued)

(52) U.S. Cl.
CPC ........ *G07F 17/3216* (2013.01); *A63F 13/211* (2014.09); *A63F 13/212* (2014.09);
(Continued)

(58) Field of Classification Search
CPC ........ H01B 7/06; B65H 75/34; B65H 75/362; B65H 75/364; B65H 75/368;
(Continued)

(56) References Cited

U.S. PATENT DOCUMENTS 2,979,576 A * 4/1961 Huber .................... H02G 11/02
                                                       191/12.4
3,705,962 A * 12/1972 Banister ................. H02G 11/02
                                                       191/12.4
(Continued)

FOREIGN PATENT DOCUMENTS

JP          2017178612         10/2017

OTHER PUBLICATIONS

International Preliminary Report on Patentability, International Application PCT/US2019/013873 dated Jul. 30, 2020.
(Continued)

*Primary Examiner* — Steven J Hylinski
(74) *Attorney, Agent, or Firm* — M. J. Ram and Associates

(57) ABSTRACT

VR game integrated machine comprise a main box, illuminating elements, a support column assembly, a display assembly, a main display and a transmission device mounted inside the main display mounting frame, the transmission device including a driving structure. The main box, located between the support columns, is movably connected to the support columns. One or more VR handles, which include a data line, is connected to a computer in the main box body via the data line. The game device head display can be automatically stored and lowered and the game controller provides for easy unattended operation so that operation is simpler, more efficient, lower in cost, and the device loss rate can be greatly reduced. Also set forth is a method for using the VR game integrated machine; the method includes the steps of starting the device, scanning the code to recharge, locking the screen, and ending the game.

6 Claims, 7 Drawing Sheets

(51) Int. Cl.
*G06Q 30/02* (2012.01)
*G02B 27/01* (2006.01)
*A63F 13/90* (2014.01)
*A63F 13/212* (2014.01)
*A63F 13/25* (2014.01)
*A63F 13/211* (2014.01)
*A63F 13/24* (2014.01)
*A63F 13/5255* (2014.01)

(52) U.S. Cl.
CPC .............. *A63F 13/24* (2014.09); *A63F 13/25* (2014.09); *A63F 13/5255* (2014.09); *A63F 13/90* (2014.09); *G02B 27/017* (2013.01); *G06Q 30/0207* (2013.01); *G07F 17/3209* (2013.01); *G07F 17/3211* (2013.01)

(58) Field of Classification Search
CPC ............ B65H 75/4418; B65H 75/4428; B65H 75/4442; B65H 75/4444; H02G 11/00; H02G 11/006; H02G 11/02; G02B 27/017; G02B 27/0176
See application file for complete search history.

(56) References Cited

U.S. PATENT DOCUMENTS

| | | | | | |
|---|---|---|---|---|---|
| 3,821,496 | A | * | 6/1974 | Malone | A61B 5/318 191/12.2 R |
| 4,114,736 | A | * | 9/1978 | Scherenberg | B65H 75/4431 191/12.4 |
| 4,232,837 | A | * | 11/1980 | Cutler | B65H 75/486 242/372 |
| 4,384,688 | A | * | 5/1983 | Smith | B65H 75/4434 191/12.2 R |
| 4,509,383 | A | * | 4/1985 | Yeh | G05G 9/04785 191/12.2 R |
| 4,735,377 | A | * | 4/1988 | Zuehsow | H04B 1/202 191/12.2 R |
| 4,901,938 | A | * | 2/1990 | Cantley | B65H 75/44 242/378.1 |
| 5,168,969 | A | * | 12/1992 | Mayhew | H02G 11/02 191/12.2 R |
| 5,372,225 | A | * | 12/1994 | Joynes | H02G 11/02 191/12.2 R |
| 5,489,010 | A | * | 2/1996 | Rogers | A63F 13/08 191/12.2 R |
| 6,068,257 | A | * | 5/2000 | Orfield | A63F 13/02 273/148 B |
| 6,144,864 | A | * | 11/2000 | Lands | H04M 1/15 361/679.4 |
| D474,183 | S | * | 5/2003 | Mesa | D14/413 |
| 6,638,166 | B2 | * | 10/2003 | Hedrick | G07F 17/32 463/20 |
| 7,309,286 | B2 | * | 12/2007 | Hedrick | G07F 17/32 273/148 R |
| 8,165,646 | B2 | * | 4/2012 | Zheng | H04R 1/1033 455/575.2 |
| 10,071,307 | B1 | * | 9/2018 | Castelli | A63F 13/212 |
| 10,179,598 | B1 | * | 1/2019 | Goodbinder | A63F 13/90 |
| 2004/0140617 | A1 | * | 7/2004 | Cordell | G07F 17/34 273/292 |
| 2015/0039517 | A1 | | 2/2015 | Liberty et al. | |
| 2017/0178392 | A1 | * | 6/2017 | Zuccarino | H04N 13/254 |
| 2017/0215293 | A1 | * | 7/2017 | Merenda | A45C 13/02 |
| 2017/0216099 | A1 | * | 8/2017 | Saladino | A41D 3/005 |

OTHER PUBLICATIONS

Anonymous: "China VR Super Hero Manufacturers and Suppliers—VR Super Hero Factory—Movie Power", Sep. 14, 2017 (Sep. 14, 2017), XP055567363, Retrieved from the Internet: URL:https://web.archive.org/web/20170914223331/http:I/www.vrmoviepower.com/vr-simulator/vr-super-hero/[retrieved on Mar. 11, 2019].

* cited by examiner

SHARED VR GAME INTEGRATED MACHINE AND METHOD OF USING SAME

TECHNICAL FIELD

This application claims benefit of Chinese Patent Application No. 201810738220.2 filed Jul. 6, 2018 and Chinese Patent Application No. 201810041883.9 filed Jan. 16, 2018.

The present invention relates to a game device, and more particularly to an integrated game machine capable of being shared by users and operating in an unattended environment, as well as a method of using the same.

BACKGROUND ART

VR game machine is a game device that can provide a virtual reality game experience.

The existing VR game machines have certain deficiencies in transmission mechanism, the VR handle and external parts combination mode, specifically:

The problems with the existing transmission technology:
1. The existing transmission technology has the problem that when a head display is pulled by an external force when it is falling, the falling process will continue, which may cause its motor to burn out or the coil to be stuck, such that the purpose of unattended operation cannot be achieved.
2. In the existing transmission technology, when a device is powered off, the head display connection cord cannot be retracted. As a result, in an unattended operation environment, this may cause property damage, and thus is not suitable for public use.

At the same time, the VR handle has the following disadvantages:
1. Problems with the data connection mode of the VR controller: the data connection mode of the VR controller adopts the Bluetooth wireless connection, such that the handle is easily interfered by the surrounding environment during operation, and generate the unstable factors such as data transmission interruption, and so on.
2. Problems with the battery power supply mode of the VR handle: the VR handle is currently powered by means of opening the rear cover of the handle, and installing two No. 5 batteries to provide power. As a result, during the operation of the handle, there could be issues caused by insufficient power, such as signal interruption and data transmission failure.
3. Problems with the VR handle main menu key activation method: VR handle has many keys, wherein when the handle is in an off mode, the main menu key needs to be pressed in order to activate the handle; in addition, when the handle is not used over a long period of time, the handle will enter the sleep mode, in such case, the main menu key needs to be pressed in order to wake up the handle, the waiting time before the handle is woken up is long (10-15 seconds as tested), which affects the user experience. In practice, VR handles are prone to incorrect operating, which may trigger the main menu key to cause the operation to be interrupted or even cause the system to crash, which affects the normal operation of the device.
4. VR handle anti-theft problem: VR handle employs wireless connection, which makes it easy to lose thus causes property damage, and is not suitable to be used in public environments.

In terms of the external structure, the prior art has problems of transportation and maintenance. In addition, VR game machines currently on the market generally have problems such as the devices are not suitable for unattended operation, or the VR devices cannot be automatically stored. If someone is on duty to attend the devices, this will increase the operating cost and make it difficult to launch product to the market. In addition, the VR device cannot be automatically collected from users; this will increase the loss rate of the device, and increase the operating cost.

SUMMARY

In order to solve the above technical problems, the present invention provides a shared VR game machine with integrating software and hardware, which can achieve sharing and unattended operation of the VR game machine, and achieve the split combination of the external parts, which is convenient for maintenance and upgrade. The present invention improves the transmission mechanism and the VR handle of the existing device. The present invention also provides a method of using the device.

The technical solution adopted by the present invention to solve the above technical problems is as follows: a shared VR game integrated machine, comprising a main box, an illuminating element, a support column assembly, a head display receiving assembly, a main display and a transmission device; the illuminating element is mounted on the main support column, the main display is fixedly disposed above the support column through a mounting frame, the head display receiving assembly is fixedly located at the uppermost portion of the machine, a rear end of the head display receiving assembly is fixedly connected with the mounting frame of the main display, and a VR handle is provided on the main box.

The transmission device is mounted in the mounting frame of the main display, the transmission device comprises a driving structure, the driving structure comprises a one-way bearing, a driving gear, a driving motor, a scroll spring, a bearing with a seat, a driving shaft, a one-way bearing, a driven gear, an electromagnetic brake, and a brake disc; the one-way bearing and the driving gear are mounted on an output shaft of the driving motor, and connected with a mounting seat, the scroll spring, the one-way bearing and the driven gear are mounted on the driving shaft, and connected to the mounting seat through the bearing with a seat and the electromagnetic brake, the brake disc is tightly fitted with the one-way bearing through an inner ring, the main box is located between the support columns on both sides thereof, and is movably connected with the support column, the VR handle comprises a handle and a customized data cable, the data cable is embedded with a steel wire, and the VR handle is connected to a computer in the main box body through the customized data cable.

The transmission device comprises the mounting seat, the driving structure, a winch and a sensor; the mounting seat comprises a driving mounting seat, a spring protection plate, a fixed base, a spring limiting piece and a front cover plate, which form a hollow structure; the winch comprises an inner disc, a connecting rod and an outer disc, and the sensor is fixed on the driving mounting seat.

The main box comprises a main box body, a touch display screen, a VR handle, a VR head display, a computer and a speaker, the main box body is connected with the front access door and the rear access cover plate to form a hollow structure, the touch display screen is mounted outside the main box body and is located right above therefrom, the VR handle is connected to the computer and extends from both sides of the main box body through the data cable, and the VR head display is connected to the computer through the data cable.

The illuminating element and the support column assembly comprises a illuminating base, an illuminating column, a ring-shaped illuminating strip, a side illuminating board, a backlight board and a main box illuminating strip, the illuminating base is in contact with the ground, and the illuminating base is connected with a display mounting frame, the ring-shaped illuminating strip is in a recess of the head display receiving box, the side illuminating board and an illuminating surface light provided thereon are connected to the display mounting frame, and the main box light illuminating strip is embedded on a ridge line of the main box body.

The head display receiving assembly comprises a head display receiving box, a head display wire roller, a head display wire tube, and a beam; the beam is connected with the main display mounting frame, the head display receiving box is connected with the beam, the head display wire roller and the head display wire tube are fixed in the beam, the cable of the VR head display is sequentially passed through the head display wire roller, the head display wire tube and reaches the transmission device, a beam cover plate is connected to the beam in order to protect internal components.

The main display comprises a display mounting frame and a liquid crystal display; the display mounting frame is connected to the illuminating base, the illuminating column, a back cover is locked tightly to the display mounting frame, and the liquid crystal display is locked tightly to the display mounting frame.

A method of using a shared VR game integrated machine comprises the following steps:

S01 starting the device: powers on the device, and enters a standby page, a user scans a QR code and enters a main interface of the system, that is, a game selection page; when the user meets a condition, the system instructs a hardware device to put down a head display;

S02 scanning the code to recharge: the system automatically determines if there is a coupon in the user's account, if there is a coupon, starting a game directly, if there is no coupon, the system automatically enters a recharge page, after the user recharges successfully, the system automatically returns to the game's starting page and starts the game. If the recharge fails or times out, it returns to the user interface;

S03 screen locking: when the user plays the game for a period of time, the system automatically determines the user account balance, if the balance is lower than a set value, locking the screen and at the same time, the screen displaying a game image, and the touch screen displaying a game platform interface; at this point, the user clicking on the touch screen to end the game, the system pops up a game result, and the user can select another game; when the user fails to recharge within a time period, the system forcibly ends the game and pops up a recharge interface;

S04 ending game: when the user fails to recharge within a time period or the game is ended manually, the system enters a state of game over, the touch screen returns to the standby page, the speaker is prompted to remove the head display, and the system instructs the hardware to collect the head display.

The beneficial effects of the present invention include:

The game device of the invention has simple operation and convenient use, the head display can be automatically stored and lowered, and the game handle can be freely controlled, thereby realizing the unattended operation of the VR sharing game machine, so that the later stage operation is simpler, more efficient, lower in cost, and the device loss rate can be greatly reduced.

The transmission mechanism of the present invention runs automatically after the machine is started, and no manual operation is required; in the case where an external force pulls during the transmission process, the transmission process automatically stops, the motor is prevented from being burned or the coil being stuck; when the machine is powered off or the operation is stopped, the transmission structure automatically enters a collection mode, so as to avoid manual collection of the device.

The handle of the present invention replaces the Bluetooth module with a customized USB data line for carrying out the data communication for the handle, and ensures the stability of the data transmission; it uses the USB data line instead of the original handle power source of No. 5 battery to ensure the continuity of the power supply; in addition, the original handle main menu key function is shielded without compromising the functions of the original circuits. Moreover, a new gravity-sensing wake-up function is added, and the handle can automatically wake up when the game is started or the user picks up the handle so the handle senses the gravity change, and automatically sleep after a period of an unattended state (12 minutes). The use of a customized USB data line (embedded with steel cord) can not only enhance the strength of the data line, but also enhance the anti-theft function.

The external machine design of the present invention adopts a split type combination, that is, the machine is divided into three major parts, including a head display receiving assembly, a machine body, and a main box, wherein the machine body is for external appearance and provides a support structure and a transmission structure; the main box mainly accommodate the core components of the machine, including a computer, a speaker, a touch screen panel, a power source and data lines, etc. The main box and the machine body are connected through a power supply data module. The three parts can be separated, and in the case where any single part is broken, that part can be directly replaced without on-site maintenance and upgrade, so as to ensure the continuous operation of the machine.

BRIEF DESCRIPTION OF THE DRAWINGS

The present invention will be further described with reference to the accompanying drawings.

DESCRIPTION OF THE EMBODIMENTS

The structural composition of the present invention will be described in detail below with reference to FIGS. 1 to 8.

Figure 1:
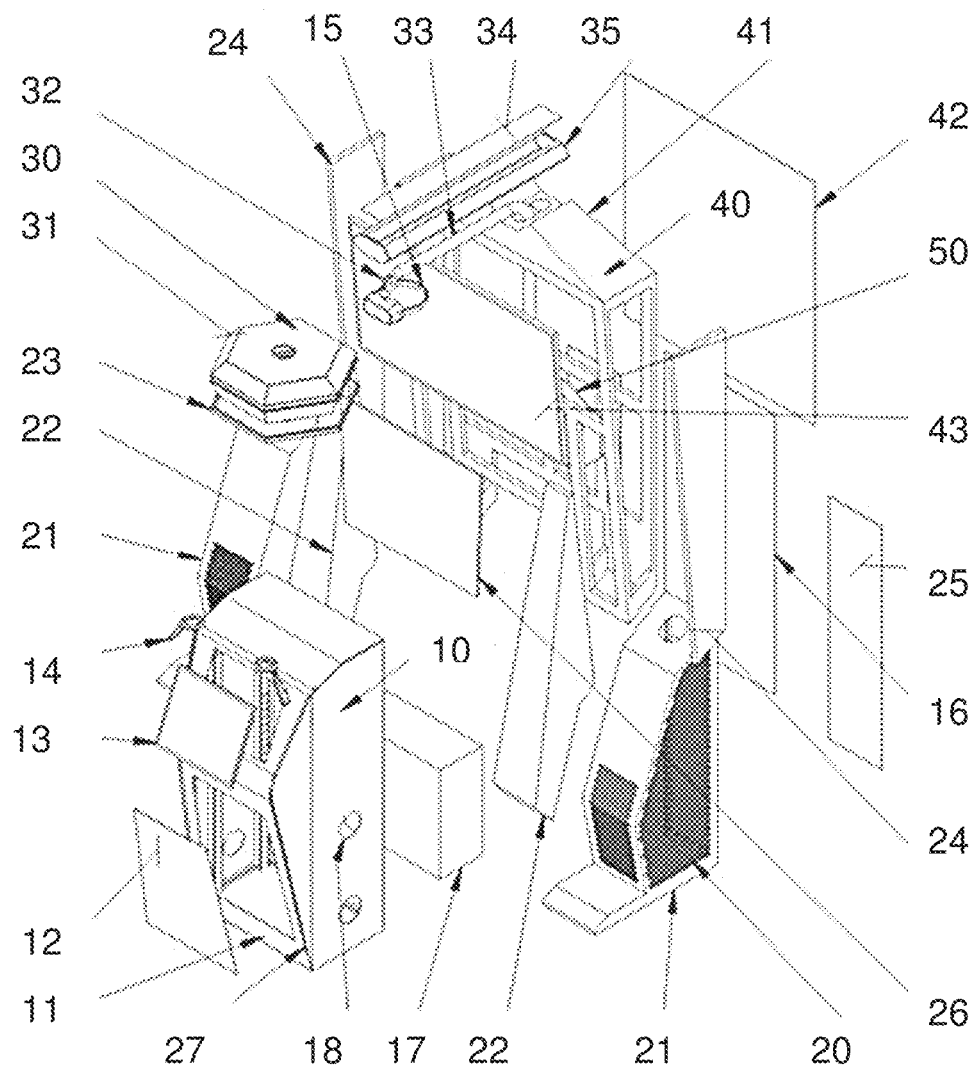
FIG. 1 is an exploded view of the overall structure of a gaming device incorporating features of the present invention.

As shown in FIG. 1, the present invention comprises a main box 10, an illuminating element and a support column 20, a head display receiving assembly 30, a main display 40, and a transmission device 50.

As shown in FIG. 1, the main box 10 comprises a main box body 11, a front door for repairs 12, a touch display screen 13, a VR handle 14, a VR head display 15, a rear repairs cover plate 16, a computer 17 and a speaker 18.

The main box 10 is a hollow structure formed by the main box body 11. The front door for repairs and the rear repair cover plate 16 are preferably connected via screws. The VR handle 14, the head display 15, and the remaining components are all installed within the hollow structure. The touch interface of the touch display panel 13 is an explosion-proof glass. The cords of the display 15 and the controller pass through a cord hole in an upper portion of the main box body 11.

As shown in FIG. 1, the illuminating element and the support column 20 is comprised of an illuminating base 21, an illuminating column 22, a ring-shaped illuminating strip 23, a side illuminating board 24, an illuminating base rear cover plate 25, a backlight board 26 and a main box illuminating strip 27. The front side and the lateral side of the illuminating base 21 have light transmission holes, the interior thereof is attached with a light softening plate, and a colorful light is rotated and projected onto the light softening plate, and at the same time, the fixed base of the entire machine is in contact with the ground. The illuminating surfaces of the illuminating column 22 are two surfaces on the front side, a circle of light is provided along the periphery of the illuminating surface, a surface light is provided in the middle, which is connected to the illuminating base 21 and the display mounting frame 41 via screws. The ring-shaped illuminating strip 23 is placed within a recess of the head display receiving box 31. The light source of the side illuminating board 24 is composed of the circle of light provided along the periphery and a surface light in the middle, which are further connected to the display mounting frame 41 via screws. The backlight panel 26 is printed with a pattern, and the pattern is made to be more prominent through the illumination of the light source on the back side. The main box illuminating strip 27 is embedded on a ridge line of the main box body 11, and the light source is a 3-color marquee light.

As shown in FIG. 1, the head display receiving assembly 30 comprises a head display receiving box 31, a head display wire roller 32, a head display wire tube 33, a beam cover plate 34 and a beam 35. The beam 35 is preferably connected with the display mounting frame 41 via screws, the head display receiving box 31 is connected with the beam 35 preferably via screws, the head display wire roller 32 and the head display wire tube 33 are fixed in the beam 35, the cable of the VR head display 15 is sequentially passed through the head display wire roller 32, the head display wire tube 33 and reaches the transmission device 5, and the beam cover plate 34 is connected to the beam 35 via screws in order to protect internal components.

As shown in FIG. 1, the main display 40 comprises a display mounting frame 41, a rear cover plate 42, and a liquid crystal display 43. The display mounting frame 41 is connected to the illuminating base 21 and the illuminating column 22 via screws, and the back cover plate 42 is locked tightly to the display mounting frame 41 via screws, and the liquid crystal display 43 is locked tightly to the display mounting frame 41 via screws in the front side.

Figure 2:
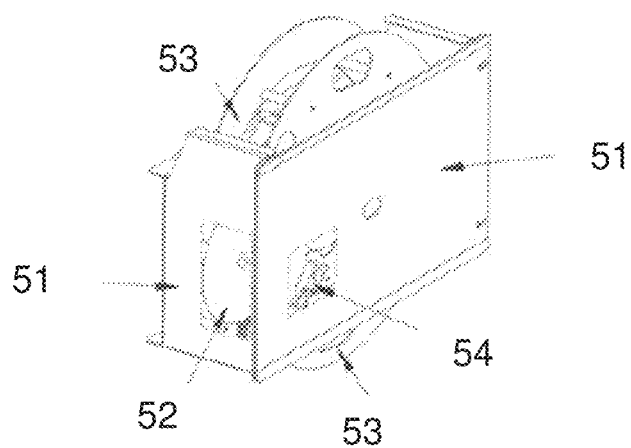
FIG. 2 is a structural view of the transmission structure of the gaming device of FIG. 1.
Figure 3:
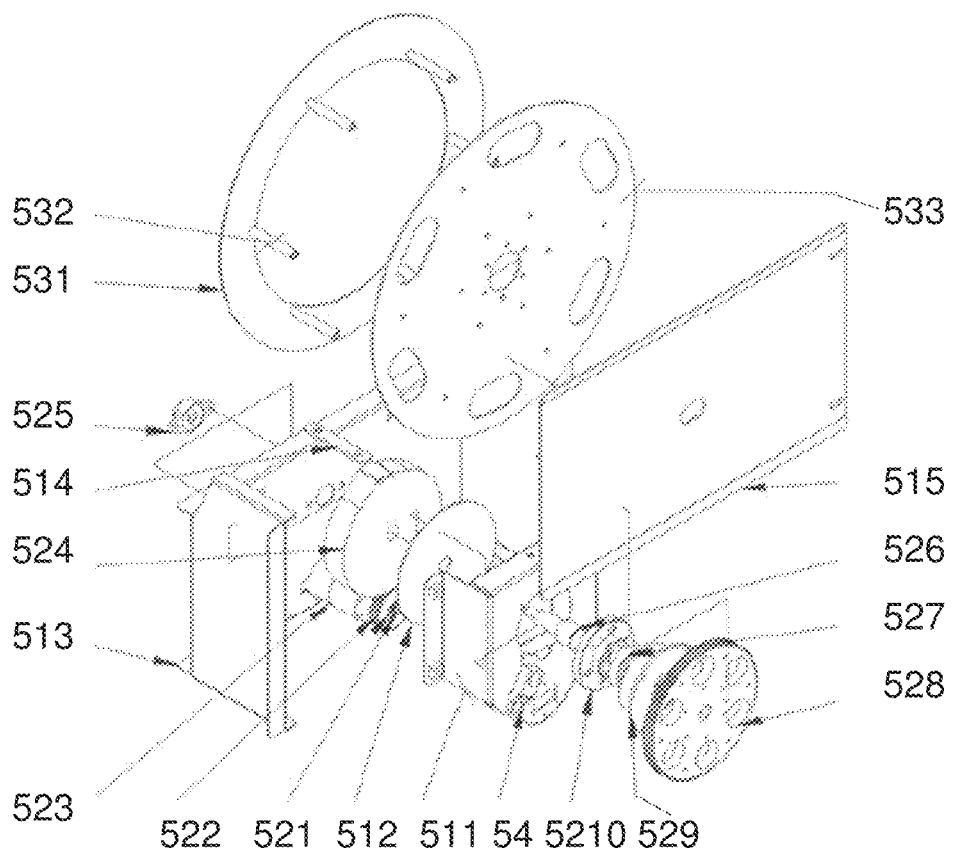
FIG. 3 is an exploded view of the structure of the transmission mechanism of the gaming device of FIG. 1.

As shown in FIGS. 2 and 3, the transmission device 50 is composed of a driving mounting seat 51, a driving device or structure 52, a winch 53 and a sensor 54. In FIG. 3 the driving_mounting seat 51 comprises a driving mounting seat 511, a spring protection plate 512, a fixed base 513, a spring limiting piece 514, and a front cover plate 515.

With reference to FIG. 3, the driving structure comprises a one-way bearing 521, a driving gear 522, a driving motor 523, a scroll spring 524, a bearing with a seat 525, a driving shaft 526, a one-way bearing 527, a driven gear 528, an electromagnetic brake 529, and a brake disc 5210.

The one-way bearing 521 and the driving gear 522 are mounted on an output shaft of the driving motor 523 and connected with a mounting seat A via screws, the scroll spring 524, the one-way bearing 527 and the driven gear 528 are mounted on the driving shaft 526, and connected to the mounting seat A through the bearing with a seat 525 and the electromagnetic brake 529 via screws, the brake disc 5210 is tightly fitted with the one-way bearing 527 through an inner ring.

The winch 53 comprises an inner disc 531, a connecting rod 532 and an outer disc 533.

The sensor 54 is responsible for providing the control circuit a signal, and stops the action after reaching the set number of turns.

The working mechanism of the transmission device is as follows: when the cord is extended, the driving motor 523 drives the driving gear 522 through the one-way bearing 521, to drive the driven gear 528 to rotate clockwise, the cord of the head display winds on the winch 53 in a clockwise direction, the winch 053 is connected to the driven gear 528 via screws, at which point the cable of the head display is extended, while the cable is released, the driven gear 528 tightens the scroll spring 524 through the driving shaft 526. After the cord releasing process is complete, the driving motor 523 stops rotating, the electromagnetic brake 529 is powered on, which then grabs and stops the brake disc 5210, the brake disc 5210 stops the driving shaft 5210 via the one-way bearing 527, such that the winch 53 is stopped. At this time, when the head display is pulled by a user, the winch 53 is driven by the cord and drives the driven gear 528 and the driving shaft 526 to rotate clockwise, and the drive shaft 526 and the brake disc 5210 slip therebetween via the one-way bearing 527, and the driven gear 528 and the driving gear 522 and the driving motor 523 slip therebetween via the one-way bearing 521, such that the cord is released. When the cord is retracted, the electromagnetic brake 529 is powered off, at which point the scroll spring 524 is used as the power source, and the cord is retracted through the drive shaft 526, the driven gear 528 and the winch 53, at the same time, the driven gear 528 and the driving gear 522 is stuck with the driving motor 523 through the one-way bearing 521, by virtue of the electromagnetic force damping generated by the rotation of the motor, the cord is retracted slowly and at a constant speed.

Figure 4:
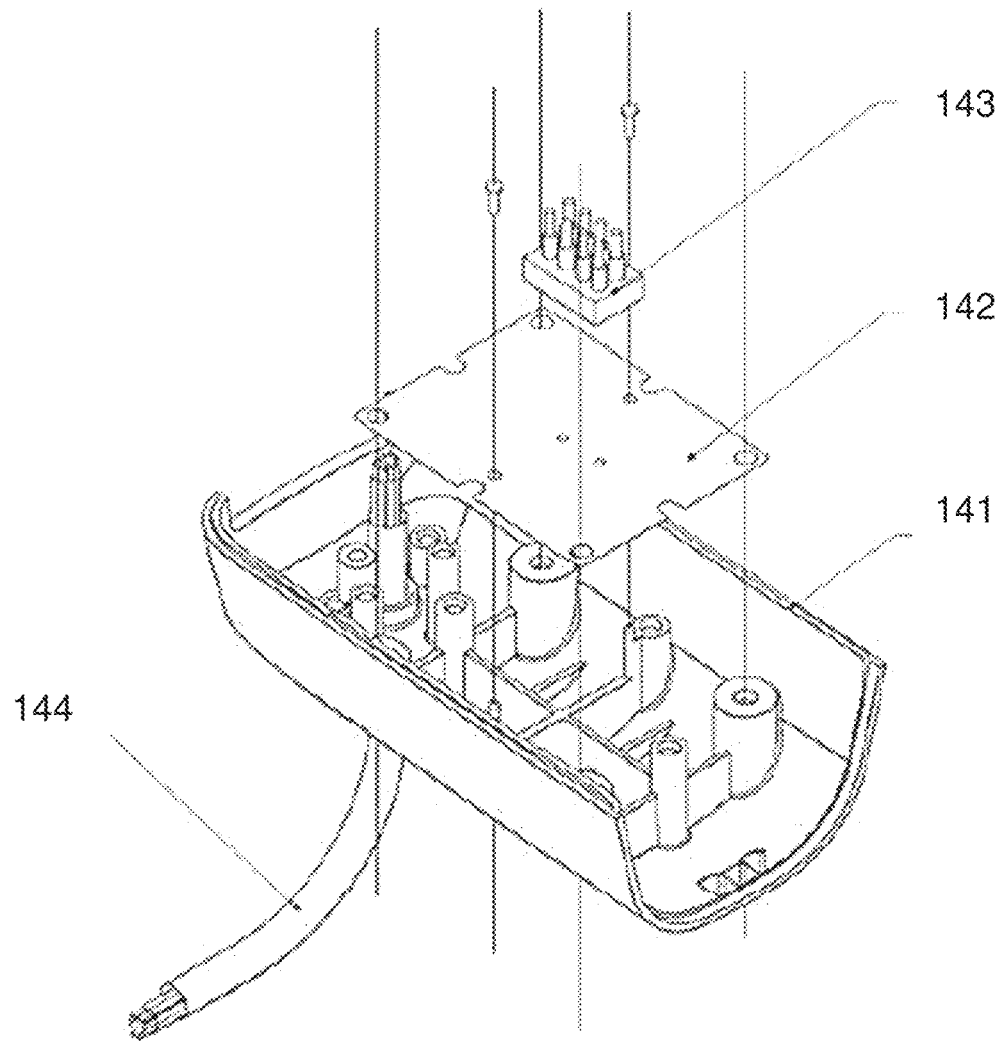
FIG. 4 is a view showing the modification on the handle power supply module structure of the gaming device of FIG. 1.

As shown in FIG. 4, the power supply module of the VR handle 14 is composed of a handle casing 141, a circuit board 142 a spring needle 143, and a customized data line 144. The circuit board 142 and the spring needle 143 are installed in the handle casing 141, one end of the customized data line 144 is soldered to the circuit board 142, and the other end is connected to the computer case 17 through the handle casing 141.

With testing it has been found that existing VR handles have deficiencies in the offline actual operating environment, and thus are unable to meet the requirements of the offline unattended phase for data transmission, equipment anti-theft function, continuous power supply and complete user experience. In addition, the original handle manufacturer cannot make improvements to overcome the foregoing deficiencies within a short period of time. In this regard, the following modifications were made to the VR handle power supply module.

1. Replace the Bluetooth module with a USB cable;
2. Use the USB cable instead of a battery to supply power;
3. Game handle automatically wakes up and automatically sleeps; and
4. Customized USB data cable;

The improved VR handle embodiment has the following advantages:

1. With regard to the data connection mode: after the handle is modified, the customized USB data cable 1.4.4 is used instead of the Bluetooth module to carry out the function of handling data communication, so as to ensure the stability of data transmission.
2. With regard to the battery power supply mode: after the handle is modified, use the customized USB data cable 1.4.4 instead of the No. 5 battery to supply power to the handle, so as to ensure the continuity of the power supply.
3. With regard to the main menu key activation mode, the invention turns off the original handle main menu key function without compromising the operation of the original circuits. In addition, it also adds the new gravity sensing wake-up function, that is, the modified handle automatically wakes up when the game is started or the user picks up the handle and the handle senses the gravity change, and automatically sleeps after a period of the unattended state (12 minutes).
3. With regard to the anti-theft function, after the handle is modified, the customized USB data cable 1.4.4 with embedded steel wire is used to enhance the data line strength and improve the anti-theft feature of the handle.

Figure 5:
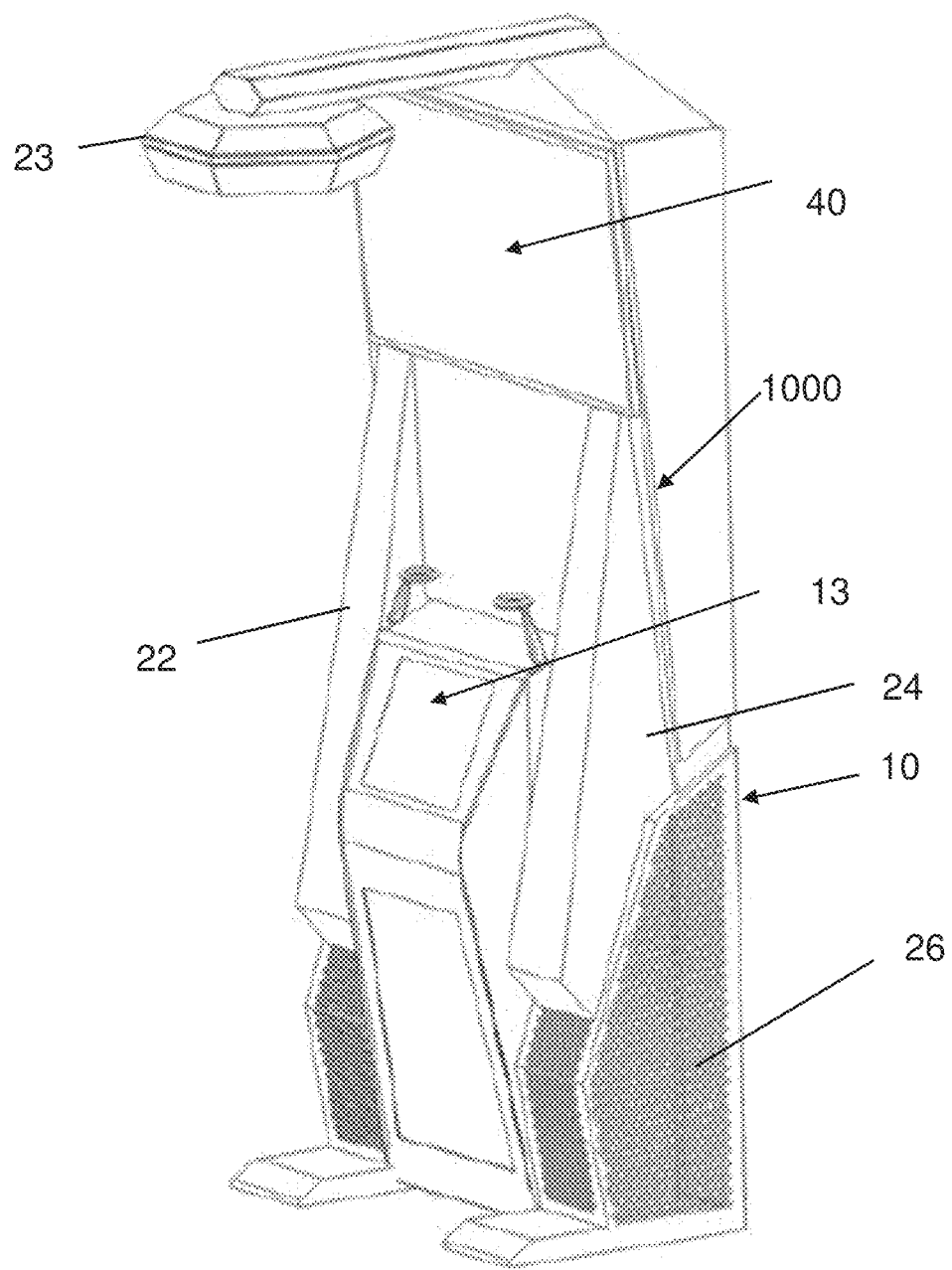
FIG. 5 is a perspective view of the structure of the gaming device of FIG. 1 after assembly.

FIG. 5 is a perspective view of the assembled machine of the present invention, showing the complete assembly of the present invention.

As shown in FIG. 5, which shows the complete combined device 1000 incorporating features of the present invention, the main display 40 in the upper portion plays an instruction video in a standby state, and plays a game screen in the working state. The angle and height of the touch display panel 13 in the upper portion of the main box 10 meets the needs of under-age users. The whole machine lighting effect is generated by the components of an LED illuminating column 22, a ring-shaped illuminating strip 23, a side illuminating board 24 and a backlight board 26. With regard to the maintenance of the whole machine, the main box 10 can be separated from the VR game machine for individual maintenance and replacement.

Figure 6:
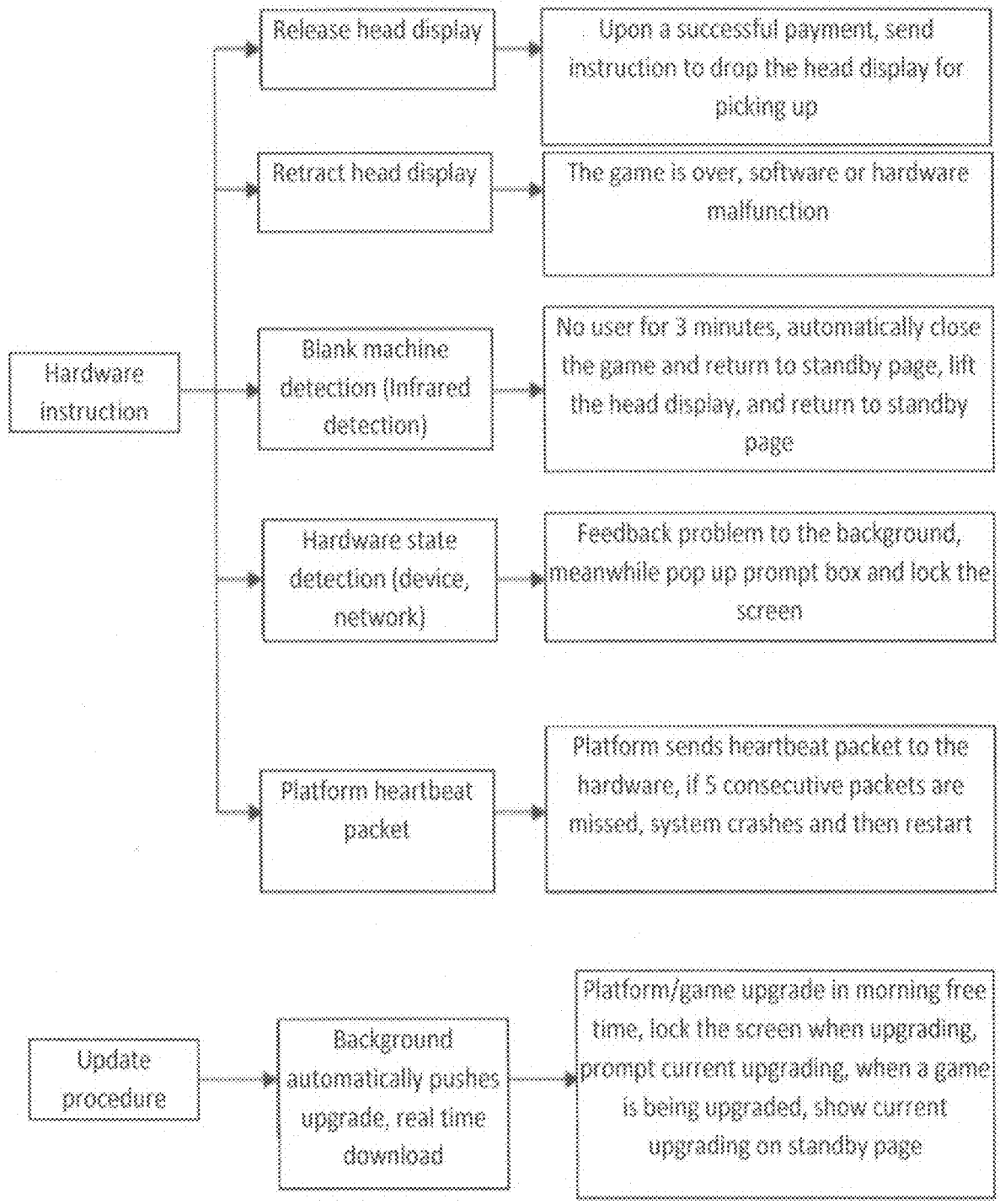
FIG. 6 is a flow chart of the operation of the structure of the gaming device of FIG. 1.

FIG. 6 is a flowchart of the working process of the present invention, which is described in detail below with reference to FIG. 6, the working process has the following steps.

[Start the device]: When the device is started for the first time from a power-off state, the computer then starts the platform; when the device is in a standby state, by clicking the screen, the a users can enter a user main interface; in addition, in the state of full-screen interface, the interface cannot be closed.

[Scan the code to pay]: The game is selected on the main user interface, and the mobile phone scans the QR code to make a payment; the system determines whether the user pays, a successful payment allow the user to directly start the game; if the payment fails or times out, the system returns to the user interface.

[Start the game]: When the user meets the conditions, the system commands the transmission device to lower the head display for pick up.

[Lock the screen]: After the user enters to play the game for a period of time, the screen is automatically locked, and the screen only shows a clock and a button to end the game.

[End the game]: After the game is over, the user clicks to close the game, the voice prompts to remove the head display, and the system commands the transmission device to collect the head display; when the user times out or the system determines that there is no operation within 10 minutes, the system ends the game, and the transmission device is commanded to collect the head display, and then return to the main user interface.

Figure 7:
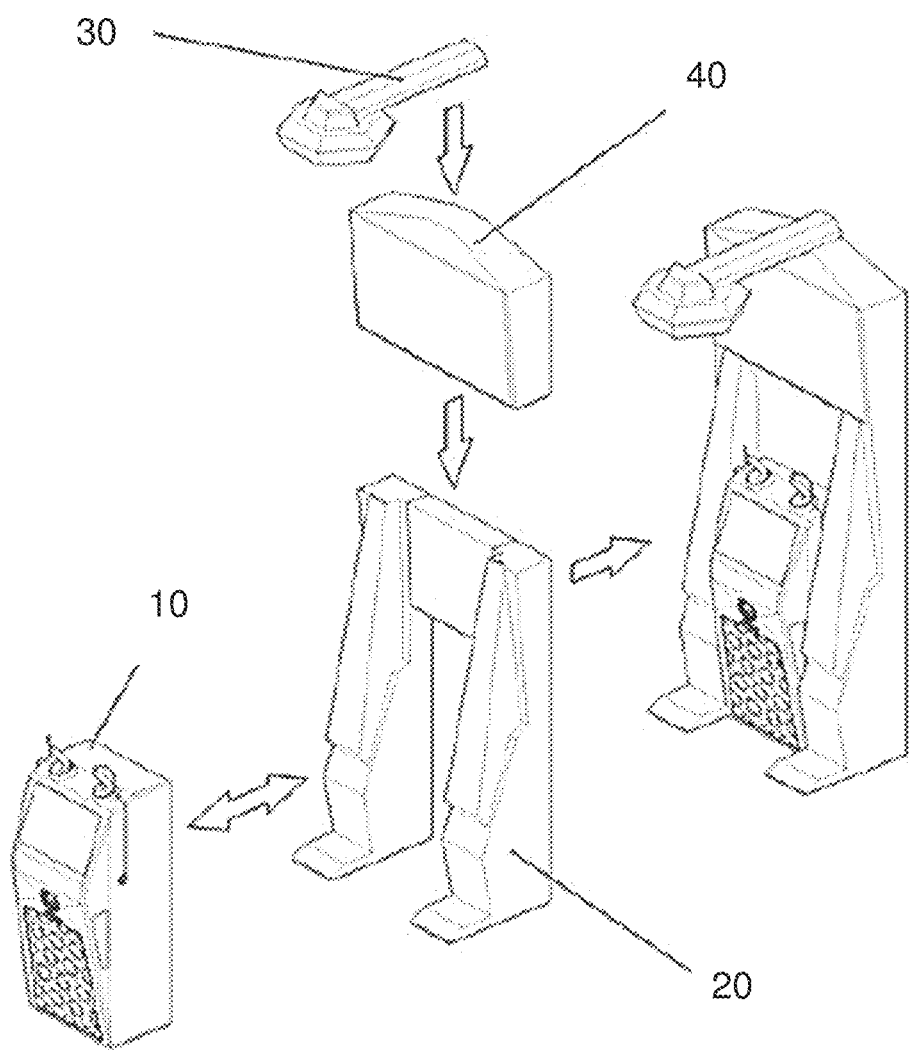
FIG. 7 is view of the technical principle of the structure of the gaming device of FIG. 1.

FIG. 7 is a view of the technical principle of devices incorporating features of the present invention, and the operation of the present invention is described in detail below with reference to FIG. 7.

This device is a software and hardware integrated machine, the software controls the hardware action through instructions, such as the head display release and collection.

The hardware control instructions include 5 kinds of command modes: release head display, retract head display, machine detection, hardware status polling detection, and platform heartbeat package.

When the user successfully pays, the instruction is executed to release the head display; when the user manually ends the game or the game time ends, the instruction is executed to retract the head display.

The device is also provided with a platform heartbeat packet instruction, and the platform periodically sends the heartbeat packet instruction to the hardware, and if five consecutive heartbeat packet have not been received, indicating the device is faulty, and the system crashes and restarts.

The device is unattended. In the aspect of software update, it automatically pushes updates through the background and automatically downloads them in real time, which will be automatically installed during the idle period of the device. During the installation process, the screen is locked and a prompt is provided; when the game is being updated, the information that the game is currently updated is displayed on the standby page.

Various modifications and changes for the present invention can be made by a person skilled in the art. Therefore, these modifications and changes are within the scope of the present invention as defined by the appended claims or equivalents.

Figure 8:
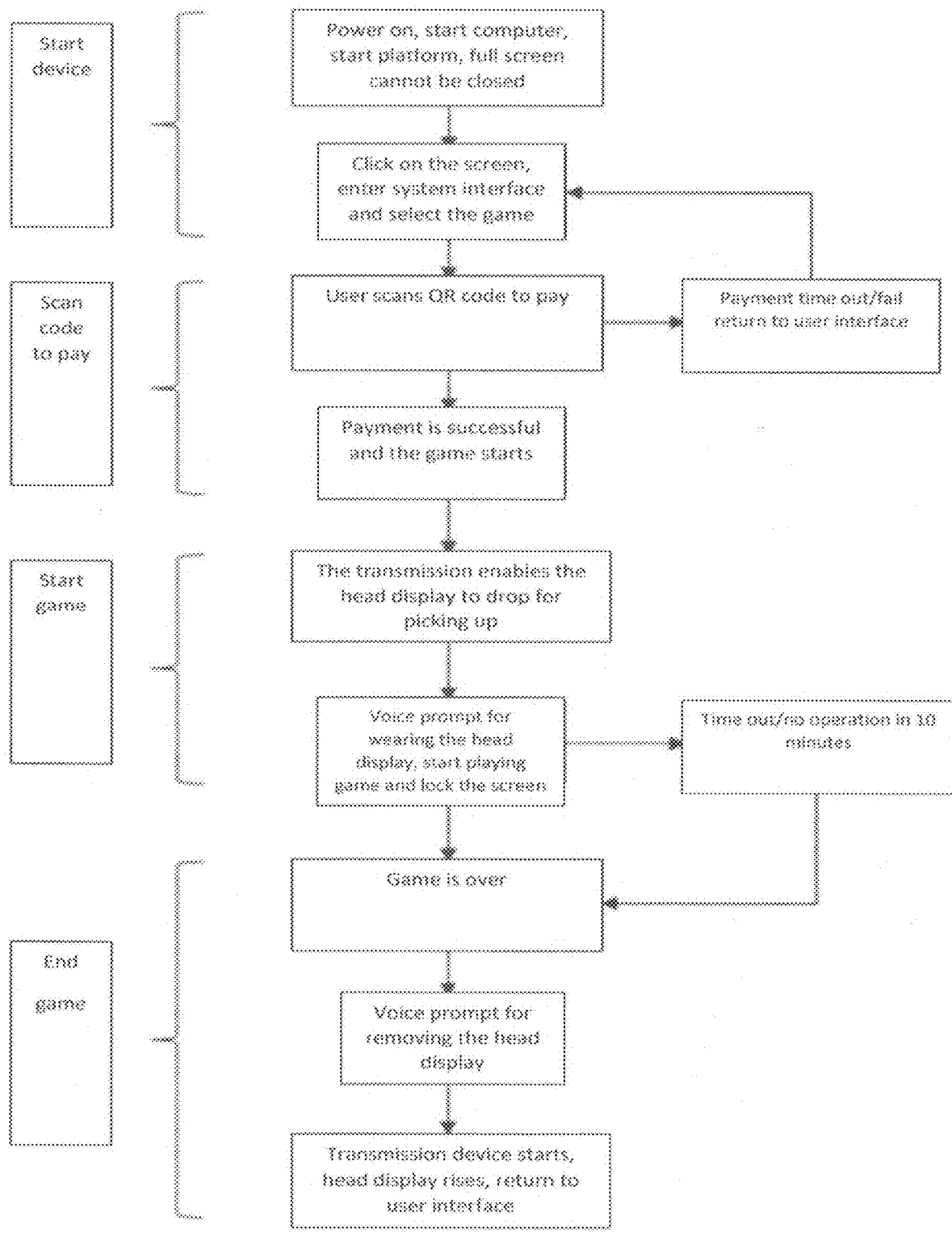
FIG. 8 is a general assembly view of the structure of the gaming device of FIG. 1.

FIG. 8 is a general assembly view of the present invention, and the connection relationship and assembly manner of the present invention will be described in detail below with reference to FIG. 8.

As shown in FIG. 8, the present invention has four main components, a main box 10, an illuminating element and the support column 20, a head display receiving assembly 30, and a main display 40.

The external device of the present invention adopts a split combination mode; the head display receiving assembly 30 is located at the uppermost part of the machine, the rear end of the assembly is connected with the main display 40. The head display receiving assembly 30 is responsible for the storage and providing of the head display cords; the main display 40 is located above the illuminating element and the support column 20, and the transmission device 50 is located inside the head display receiving assembly 3.0.

The illuminating element and the support column 20 bear the main structural support, the weight balance, and the attachment of the appearance component; the main box 10 is located in the middle to lower part of the illuminating element and the support column 20 and between the two columns. The main box 10 accommodates the core components, including the computer, the handle, the speaker, the touch screen panel, the power supply and the data transmission line. The main display 40 and the main box 10 are connected by the power supply data module. The VR game machine and the main box 10 can be separated. The bottom of the main box 10 is equipped with rollers (not shown), which can facilitate moving VR game machine straight forward, so as to help the maintenance or repair of the machine. After the maintenance is completed, the machine can be pushed back in the opposite direction to its original location.

A main concept of the integrated VR game machine incorporating features of the present invention is that the VR game machine can operate in an unattended environment, the object is to achieve the requirements of easy transportation, easy installation, easy operation and easy maintenance.

The new external parts design adopts a split combination mode, and the machine can be divided into three parts: a head display receiving assembly, a machine body and a main box. The machine body part mainly bears the functions of appearance, support structure and transmission structure; the main box part mainly bears the function of housing the core components, including the computer, the handle, the speaker, the touch screen panel, the power supply and the data transmission line. The main box and the machine body are connected by a power supply data module. The head display receiving assembly, the machine body, and the main box can be separate. Any component damage can be directly replaced without on-site maintenance and upgraded so as to ensure the continuous operation of the machine.

Various modifications and changes for the present invention can be made by a person skilled in the art. Therefore, these modifications and changes are within the scope of the present invention as defined by the appended claims or equivalents.

The invention claimed is:

1. A shared VR game integrated machine, comprising a main box, an illuminating element, a support column assembly, a VR head display and a head display receiving assembly, a main display and a transmission device located within the head display receiving assembly, wherein:
   a. the illuminating element is mounted on the support column assembly,
   b. the main display is fixedly disposed above the support column through a mounting frame,
   c. the head display receiving assembly is fixedly located at an uppermost portion of the VR game integrated machine,
   d. a rear end of the head display receiving assembly is fixedly connected with the mounting frame, such that the transmission device operates to extend and collect a VR head display or a VR head display cable, and
   e. one or more VR handles are provided on the main box, characterized in that the transmission device is mounted in the mounting frame, the transmission device comprising a driving structure, the driving structure comprising a one-way bearing, a driving gear, a driving motor, a scroll spring, a bearing with a seat, a driving shaft, a driven gear, an electromagnetic brake, and a brake disc,
   f. the one-way bearing and the driving gear mounted on an output shaft of the driving motor and connected with a mounting seat,
   g. the scroll spring, the one-way bearing and the driven gear mounted on the driving shaft, and connected to the mounting seat through the bearing with a seat and the electromagnetic brake,
   h. the brake disc fitted with the one-way bearing through an inner ring,
   i. the main box located between the support columns, the main box movably connected to the support columns, and
   j. the one or more VR handles comprising a user manually-operated handles and a data cable, the data cable being embedded with a steel wire such that the VR handles are connected to a computer in the main box body through the data cable.

2. The shared VR game integrated machine according to claim 1, characterized in that the transmission device comprises the mounting seat, the driving structure, a winch and a sensor;
   a. the mounting seat comprising a driving mounting seat, a spring protection plate, a fixed base, a spring limiting piece and a front cover plate; and
   b. the winch comprising an inner disc, a connecting rod and an outer disc,
   c. the sensor being fixed on the driving mounting seat.

3. The shared VR game integrated machine according to claim 1, characterized in that the main box comprises a main box body, a touch display screen, the one or more VR handles, a VR head display, a computer and a speaker wherein
   a. the main box body is connected with the front access door and the rear access cover plate to form a hollow structure,
   b. the touch display screen is mounted outside the main box body and is located above the main box body,
   c. the one or more VR handles is are connected to the computer and extend from both sides of the main box body through the data cable, and
   d. the VR head display is connected to the computer through the data cable.

4. The shared VR game integrated machine according to claim 1, characterized in that the illuminating element and the support column assembly comprise an illuminating base, an illuminating column, a ring-shaped illuminating strip, a side illuminating board, a backlight board and a main box illuminating strip wherein
   a. the illuminating base is in contact with a ground surface, and is connected with a display mounting frame,
   b. the ring-shaped illuminating strip is located in a recess in a head display receiving box,
   c. the side illuminating board and an illuminating surface light is provided thereon connected to the display mounting frame, and
   d. a main box light illuminating strip is embedded on a ridge line of the main box body.

5. The shared VR game integrated machine according to claim 1, characterized in that the head display receiving assembly comprises a head display receiving box, a head display wire roller, a head display wire tube, and a beam, the beam connected with the main display mounting frame wherein
   a. the head display receiving box is connected with the beam,
   b. the head display wire roller and the head display wire tube are fixed in the beam,
   c. the cable of the VR head display is sequentially passed through the head display wire roller, the head display wire tube and connects to the transmission device, and
   d. a beam cover plate is connected to the beam in order to protect internal components.

6. The shared VR game integrated machine according to claim 1, characterized in that the main display comprises a display mounting frame and a liquid crystal display wherein the display mounting frame is connected to the illuminating base and the illuminating column, a back cover is secured to the display mounting frame and the liquid crystal display is secured to the display mounting frame.

* * * * *